United States Patent

Ohlsson

[15] 3,651,841
[45] Mar. 28, 1972

[54] SAW TOOTH

[72] Inventor: Olof Axel Ohlsson, Rindagatan 16, Stockholm, Sweden

[22] Filed: Sept. 9, 1968

[21] Appl. No.: 758,488

[30] Foreign Application Priority Data

Sept. 22, 1967 Sweden..............................13,084/67

[52] U.S. Cl. .........................................143/133 R, 143/141
[51] Int. Cl........................................................B27b 33/02
[58] Field of Search ..........................143/133, 140, 141, 143

[56] References Cited

UNITED STATES PATENTS

| 772,154 | 10/1904 | Juengst | 143/133 UX |
| 2,644,494 | 7/1953 | Lundberg | 143/143 X |
| 2,771,918 | 11/1956 | Watson | 143/133 |
| 3,372,719 | 3/1968 | Shone | 143/141 |

FOREIGN PATENTS OR APPLICATIONS

764,363  12/1956  Great Britain..........................143/133

Primary Examiner—Donald R. Schran
Attorney—Young & Thompson

[57] ABSTRACT

A saw tooth intended primarily for sawing wood, particularly in one direction of movement, and having a tip which is given an increased thickness in relation to the remainder of the tooth by upsetting or some other method, and bevelled surfaces so arranged that they form one or more oblique cutting edges presenting a clearance angle. The cutting edge or each of the cutting edges is formed by the intersecting line between a bevelled surface on an upper surface on the tooth and an under surface on said tooth. The bevel angle is at least 27° and at most 60°.

2 Claims, 28 Drawing Figures

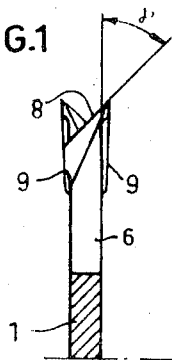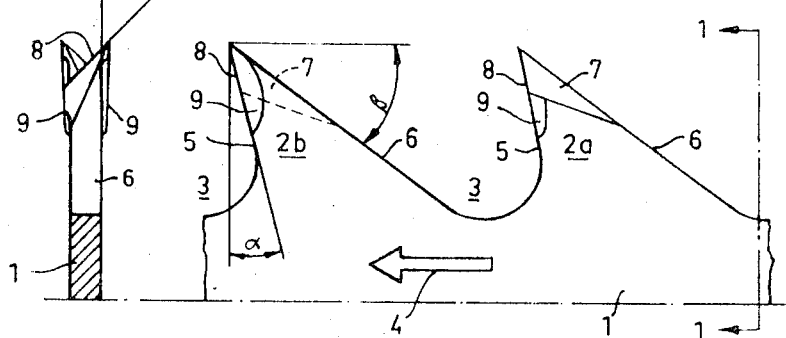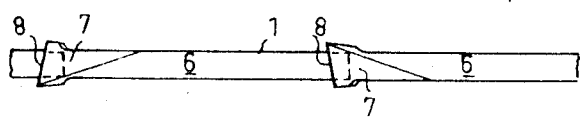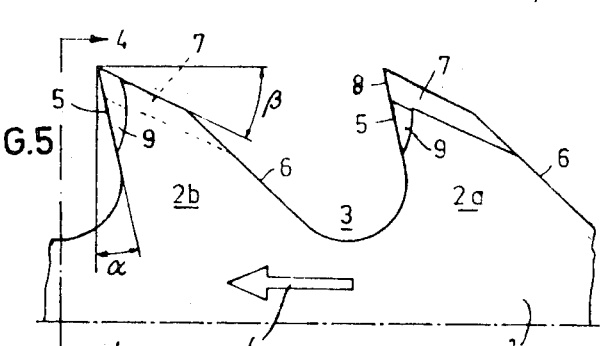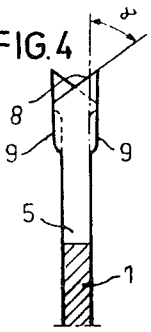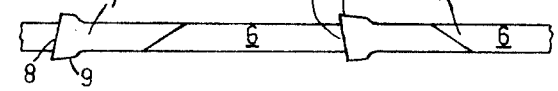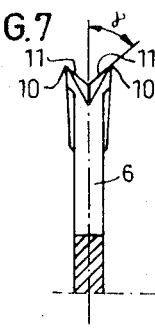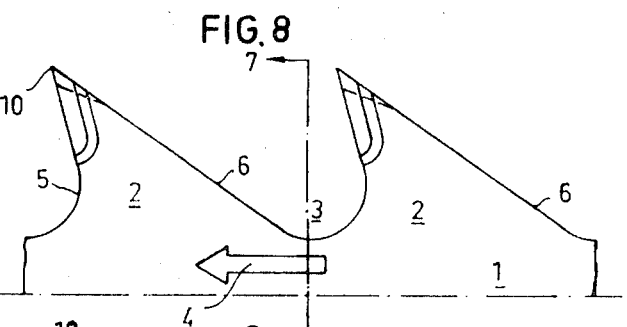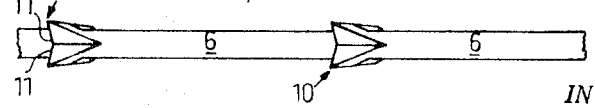

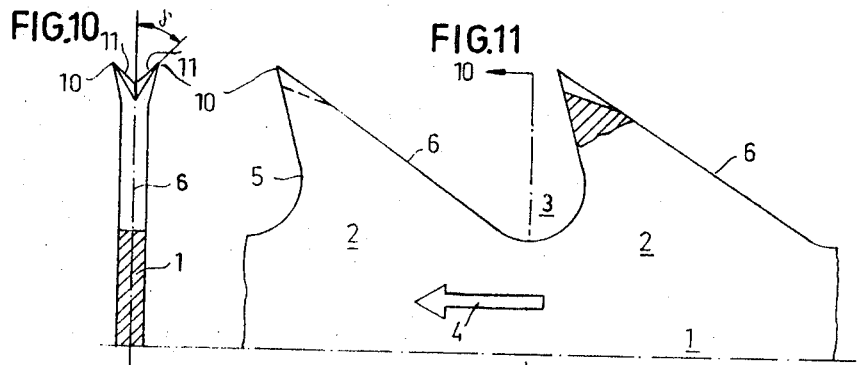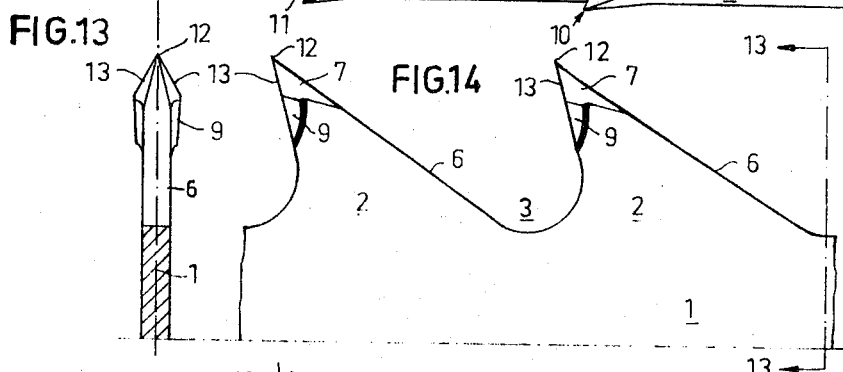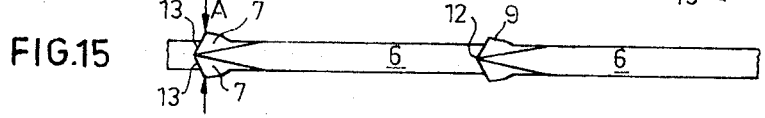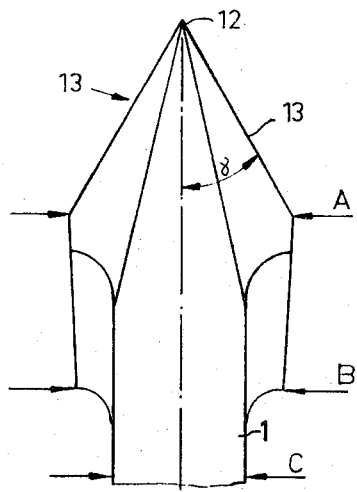

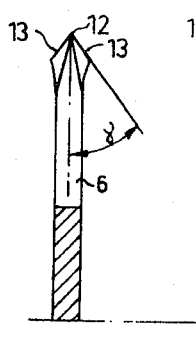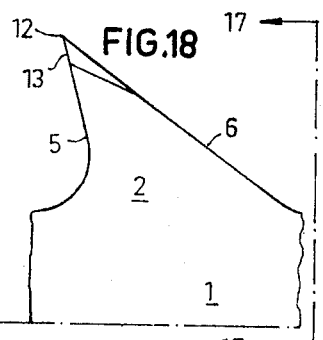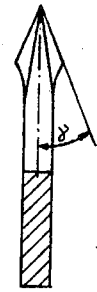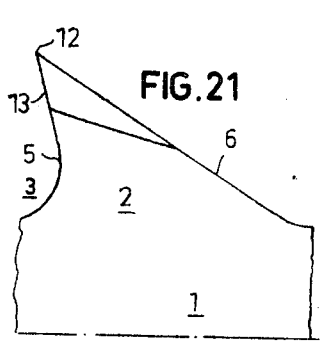
FIG.17  FIG.18  FIG.20  FIG.21
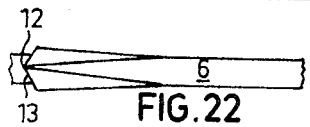
FIG.19  FIG.22
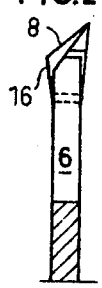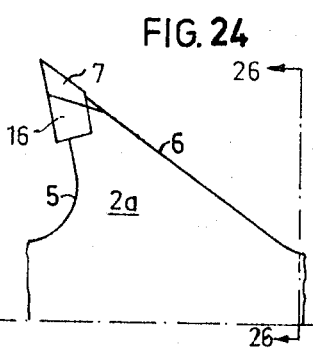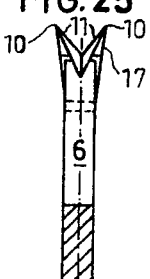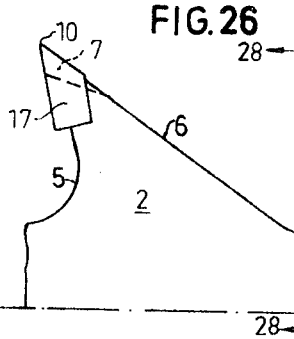
FIG.23  FIG.24  FIG.25  FIG.26
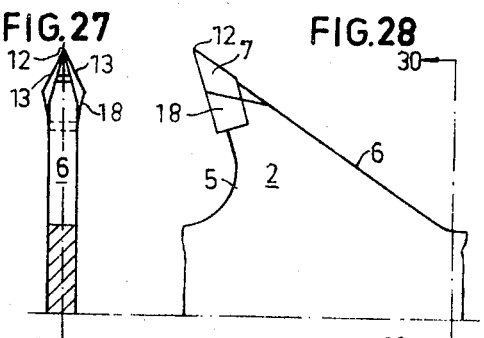
FIG.27  FIG.28

SAW TOOTH

The present invention is concerned with a saw tooth — primarily for cutting wood, particularly in one direction of movement — provided with a tip which has been given increased thickness in relation to the remainder of the tooth by upsetting, swaging or some other method. In general, saw teeth of this type have been found to give better results than the older type of teeth which have been set. At the beginning, saw teeth provided with tips of the type described had a cutting edge which was directed transversely and perpendicular to the planar side surfaces of the saw blade, and a length which was somewhat longer than the thickness of said blade. It is now also known to provide such teeth with bevelled surfaces, arranged so that they form at least one oblique cutting edge presenting a clearance angle.

These saw teeth were admittedly an improvement on the set teeth, but both the perpendicular cutting edge and the oblique edge presenting a clearance angle function essentially like a chisel and produce short, particulate chips and a relatively rough cut.

The invention, which can be applied to sawing devices of the most widely differing types, including sash saws, circular saws and hand saws, is intended to eliminate these disadvantages, and a saw tooth designed according to the invention is, for this purpose, mainly characterized in that the cutting edge or each of the cutting edges is formed by the intersecting line between a bevelled surface on the upper surface of the tooth and an under surface on said tooth, and that the bevel angle is at least 27° and at most 60°. The advantage presented by the oblique cutting edges according to the invention over the known transversely directed cutting edges is that they cut cleanly, like a knife, which means that a saw tooth designed in accordance with the invention gives a longer, and in the case of cellulose digesting processes, fiberboard manufacturing processes etc., a more useful chip besides leaving a smoother cut surface on the sawn wood. In addition to the two aforementioned advantages, saws provided with teeth designed according to the invention have also been found to possess a greater cutting ability than teeth used hitherto, which has enabled the feed to be increased by 50 percent with unchanged overhang; i.e., the angle at which the blade meets the wood. Furthermore, the risk of misfunction due to heat is less, operation quieter and the power consumption lower. One factor contributing to the good result obtained with respect to reciprocating saw blades is that the teeth according to the invention scratch a groove during the "idling stroke," which facilitates the sawing operation on the working stroke.

The invention will now be described with reference to the accompanying drawings, which show by way of example and in enlarged scale a portion of a sash saw provided with teeth designed according to the invention. In the drawings FIG. 1 is a fragmentary cross-sectional view of a saw tooth according to the present invention, taken on the line 1—1 of FIG. 2;

FIG. 2 is a side elevational view of two saw teeth according to the embodiment of FIG. 1;

FIG. 3 is a top plan view of FIG. 2;

FIGS. 4, 5 and 6 are views similar to FIGS. 1, 2 and 3, respectively, but showing a second embodiment of the invention;

FIGS. 7, 8 and 9 are views similar to FIGS. 1, 2 and 3, respectively, but showing a third embodiment of the invention;

FIGS. 10, 11 and 12 are views similar to FIGS. 1, 2 and 3, respectively, but showing a fourth embodiment of the invention;

FIGS. 13, 14 and 15 are views similar to FIGS. 1, 2 and 3, respectively, but showing a fifth embodiment of the invention;

FIG. 16 is an enlarged fragmentary view of a portion of FIG. 13;

FIGS. 17, 18 and 19 are views similar to FIGS. 1, 2 and 3, respectively, but showing a sixth embodiment of the invention;

FIGS. 20, 21 and 22 are views similar to FIGS. 1, 2 and 3, respectively, but showing a seventh embodiment of the invention;

FIGS. 23 and 24 are views similar to FIGS. 1 and 2, respectively, but showing an eighth embodiment of the invention;

FIGS. 25 and 26 are views similar to FIGS. 1 and 2, respectively, but showing a ninth embodiment of the invention; and FIGS. 27 and 28 are views similar to FIGS. 1 and 2, respectively, but showing a tenth embodiment of the invention.

FIGS. 1–3 show two saw teeth in an end view, a sideview and a view of the saw blade portion seen towards the tooth line. In this embodiment the teeth according to the invention are bevelled alternately, every other tooth 2a on the one and every other 2b on the other side surface, FIGS. 4–6 illustrate embodiments of teeth which have an essentially parallel trapezium-shaped top surface, FIGS. 7–9 and 10–12 show in corresponding views the oblique cutting edges combined in one and the same tooth, which has a split form, FIGS. 13–22 show the oblique cutting edges combined in the same tooth, which has been bevelled symmetrically on both side faces of the tooth tip, and FIGS. 23–28 illustrate how the various designs of the tooth tip can be produced with hard metal cutting bits soldered to the tooth, the bits being ground to present one or more oblique cutting edges according to the invention.

In FIGS. 1–3 the reference numeral 1 identifies the saw blade proper, numerals 2a and 2b saw teeth with cutters alternating on either side of the saw blade, and numeral 3 the gap between the teeth. The teeth work in the direction of arrow 4. Each tooth has an under surface 5 perpendicular to the sides of the blade and presenting a positive cutting angle $\alpha$, and an upper surface 6 which slopes towards the rearwardly lying tooth gap and presents a clearance angle $\beta$. The upper surface 6 is bevelled at the tip of the tooth, the plane of the bevel 7 forming the angle $\gamma$ to the side surfaces of the blade. The intersecting line between the bevel surface 7 and the under surface 5 forms the oblique cutting edge 8 characteristic of the invention. The tips of the teeth have been made thicker than the actual saw blade, by upsetting, so that the blade is able to pass freely in the cut during sawing. Projections or prominotories caused by the upsetting process are identified by the reference numeral 9.

Full scale tests have shown that the positive cutting angle $\alpha$ can substantially be varied within the limits 5° and 30°, the clearance angle $\beta$ between 5° angle and the bevel angle $\gamma$ between 27° and 60°. Excellent results have been obtained during tests with single-bevel teeth shown in FIGS. 1–3, when $\gamma = 35°$–$45°$.

In the embodiment shown in FIGS. 1–3 the bevel surface 7 is essentially triangular in shape. This surface, which can also be designated top surface, can however, according to the invention also essentially be in the shape of a trapezoid, whereupon the saw teeth obtain the appearance depicted in FIGS. 4–6. The reference numerals employed in the first three figures are also used to identify corresponding details in following figures. The bevelling in the embodiment shown in FIGS. 4–6 produces good results if the bevel angle $\gamma$ is kept within the range of 27°–60° with a positive cutting angle $\alpha$ varying within the limits 5° and 30° and the clearance angle $\beta$ is between 5° and 35°.

As previously mentioned, the oblique cutting edge according to the invention can also be produced in ways other than shown in FIGS. 1–6. Thus it is possible to combine the alternating bevelling on both side surfaces of the teeth in one and the same tooth, whereupon the tip of the tooth obtains the V-shape depicted in FIGS. 7–9. In this way the tip of the tooth, which has been thickened by upsetting, for instance, obtains two small points 10 which present two opposing, oblique cutting edges 11. The width of the saw tooth across the two points is equalized to optimum measurements for free passage of the saw blade. The bevel angle $\gamma$, see FIG. 7, should be chosen between 27° and 60°.

A saw tooth presenting principally the same form as that shown in FIGS. 7–9 can be obtained by upsetting and grinding. As will be seen from FIGS. 10–12, this embodiment lacks the projections or prominotories 9, which are formed in the embodiments previously described.

According to a modification of the invention, two oblique cutting edges can also be obtained by double-side bevelling on the outside of an upset tooth, as shown in FIGS. 13–16. In this instance a symmetric tip 12 is obtained on each tooth with the two oblique cutting edges 13. The bevel angle $\gamma$ (see the enlarged view in FIG. 16) which in this instance forms half the rake angle of the tip should lie within the range of 15° to 60°. The greatest thickness A of the tip, produced by upsetting, for instance, is equalized to a smaller measurement B, which affords clearance in the cutter. The measurement C is the thickness of the saw blade 1.

A saw tooth principally of the same design as shown in FIGS 13–16 can be obtained by an upsetting process, which may not require a subsequent grinding process. An illustration of a saw tooth produced in this manner is given in FIGS. 17–22, of which FIGS. 17–19 and 20–22 show in directly comparable views the appearance of two teeth of this type presenting different rake angles. The tooth shown in FIGS. 17–19 has a rake angle of 90°, i.e., a bevel angle $\gamma$ of 45°, whereas the tooth shown in FIGS. 20–22 has a rake angle of half the size, that is 45°, and hence has a bevel angle $\gamma$ of only 22.5°.

If the tip of the saw tooth is given increased thickness by fixing hard metal bits thereto, the bits can be bevelled in accordance with the invention by grinding, so that the tip obtains an oblique cutting edge or cutting edges with clearance. This is illustrated in the pairs of FIGS. 23–24 up to and including 27–28, which show how hard metal bits 16, 17, 18 fixed to the tip of the tooth have been bevelled and have obtained cutting edges according to the previously described embodiments of the invention.

The saw tooth according to the invention has been particularly tested in sash saws, but in addition to being used for sawing wood and other organic material such as bone, cork, rubber and plastic material may also be used, subsequent to making suitable adjustment to the cutting angle and cutting speeds, for sawing metals.

What I claim is:

1. A saw tooth having a tip which has a greater thickness than the rest of the tooth, said saw tooth having thereon bevelled surfaces forming the tip of the tooth and so disposed that they form a straight oblique cutting edge, said tooth having a substantial clearance angle of 5° to 45° on its rear outer side, said cutting edge being the intersection between a bevelled surface on the outer side of the tooth and a forward under surface of the tooth disposed at a positive cutting angle of 5° to 30°, said bevelled surface being disposed at an angle of 27° to 60° to the plane in which the tooth moves.

2. A saw tooth as claimed in claim 1, in which said bevelled surface is disposed at an angle of 35° to 45° to the plane in which the tooth moves.

* * * * *